United States Patent
Asada et al.

(10) Patent No.: US 11,913,871 B2
(45) Date of Patent: Feb. 27, 2024

(54) PHYSICAL PROPERTY EVALUATION METHOD AND DEVICE

(71) Applicant: MAZDA MOTOR CORPORATION, Hiroshima (JP)

(72) Inventors: Teruaki Asada, Hiroshima (JP); Tatsuya Ezaki, Hiroshima (JP); Tsutomu Shigenaga, Hiroshima (JP); Akihide Takami, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 840 days.

(21) Appl. No.: 16/811,380

(22) Filed: Mar. 6, 2020

(65) Prior Publication Data
US 2020/0386667 A1  Dec. 10, 2020

(30) Foreign Application Priority Data

Jun. 7, 2019 (JP) .................. 2019-107147
Jun. 7, 2019 (JP) .................. 2019-107155

(51) Int. Cl.
*G01N 17/02* (2006.01)
*G01N 27/26* (2006.01)

(52) U.S. Cl.
CPC ............ *G01N 17/02* (2013.01); *G01N 27/26* (2013.01)

(58) Field of Classification Search
CPC ........ G01N 17/02; G01N 27/26; G01N 27/02; G01N 17/006
See application file for complete search history.

(56) References Cited

U.S. PATENT DOCUMENTS

2019/0330478 A1 * 10/2019 Kawamura .......... C09D 201/00

FOREIGN PATENT DOCUMENTS

| CN | 109137041 A | * | 1/2019 | ........... C25D 11/026 |
| DE | 102011108868 A1 | * | 5/2012 | ........... G01N 17/002 |
| JP | S58-90157 A | | 5/1983 | |
| JP | S5890157 A | * | 5/1983 | |
| JP | S59-48649 A | | 3/1984 | |
| JP | S5948649 A | * | 3/1984 | |
| JP | H05-312747 A | | 11/1993 | |
| JP | 2009180556 A | * | 8/2009 | |
| JP | 2011017031 A | * | 1/2011 | ............ C23C 16/46 |

(Continued)

OTHER PUBLICATIONS

Yamamoto et al., English translation of JPS5948649A, 1984 (Year: 1984).*

(Continued)

*Primary Examiner* — Joshua L Allen
*Assistant Examiner* — Shizhi Qian
(74) *Attorney, Agent, or Firm* — Studebaker & Brackett PC

(57) ABSTRACT

A physical property evaluation method is the method for evaluating physical properties of a film-shaped measurement target object by means of an electrochemical method, the method including the step of causing an electrolytic solution to contact a front surface of the measurement target object. The speed of penetration of the electrolytic solution into the measurement target object is adjusted in such a manner that the levels of the front-side temperature and the back-side temperature of the measurement target object and a difference between the front-side temperature and the back-side temperature of the measurement target object are adjusted.

5 Claims, 6 Drawing Sheets

(56) References Cited

FOREIGN PATENT DOCUMENTS

| JP | 2016-050915 A | | 4/2016 |
|---|---|---|---|
| JP | 2016050916 A | * | 4/2016 |

OTHER PUBLICATIONS

Mukohara et al., English translation of JPS5890157A, 1983 (Year: 1983).*
Li, English translation of CN-109137041-A, 2019 (Year: 2019).*
Komino et al., English translation of JP-2011017031-A, 2011 (Year: 2011).*
Kinugasa et al., English translation of JP2009180556A, 2009 (Year: 2009).*
Anonymous, "Metal corrosion protection and its test methods", Beijing Municipal Bureau of Machinery Industry Technology, Dec. 31, 1981, pp. 197-200.

* cited by examiner

PHYSICAL PROPERTY EVALUATION METHOD AND DEVICE

CROSS-REFERENCE TO RELATED APPLICATIONS

This claims priority to Japanese Patent Application No. 2019-107147 filed on Jun. 7, 2019 and Japanese Patent Application No. 2019-107155 filed on Jun. 7, 2019, the entire disclosures of which are incorporated herein by reference.

BACKGROUND

The present disclosure relates to physical property evaluation method and device.

Typically, evaluation of physical properties of a coating film, such as corrosion resistance, by means of an electrochemical method has been performed (see, e.g., Japanese Unexamined Patent Publication No. 2016-050915).

SUMMARY

In the field of material development, step management at a paint plant, and improvement of vehicle rust-proof quality, speed-up of various evaluation steps using an electrochemical method has been demanded. Meanwhile, for more specifically figuring out a mechanism in electrochemical reaction, it might be, in some cases, effective that a measurement speed at an electrochemical measurement step is decelerated. Because of such a situation, development of the technique of adjusting the measurement speed of the electrochemical measurement step as necessary according to a measurement purpose has been demanded.

The present disclosure is intended to provide physical property evaluation method and device capable of adjusting a measurement speed as necessary.

For solving the above-described problem, the physical property evaluation method disclosed herein is a method for evaluating physical properties of a film-shaped measurement target object by means of an electrochemical method, the method including the step of causing an electrolytic solution to contact a front surface of the measurement target object. The speed of penetration of the electrolytic solution into the measurement target object is adjusted in such a manner that the levels of the front-side temperature and the back-side temperature of the measurement target object and a difference between the front-side temperature and the back-side temperature of the measurement target object are adjusted.

Fluid moves from a high-temperature location with high energy to a low-temperature location with low energy. According to the present configuration, the front-side temperature of the measurement target object contacting the electrolytic solution is set higher or lower than the back-side temperature. With this configuration, as compared to a case where the front side and the back side have the same temperature, the speed of penetration of the electrolytic solution into the measurement target object can be accelerated or decelerated. That is, by adjusting the levels of the front-side temperature and the back-side temperature of the measurement target object and the difference between the front-side temperature and the back-side temperature of the measurement target object, the speed of penetration of the electrolytic solution into the measurement target object can be adjusted. Thus, a measurement speed at an electrochemical measurement step can be adjusted as necessary.

In a preferred aspect, the front-side temperature of the measurement target object is set higher than the back-side temperature.

According to the present configuration, the speed of penetration of the electrolytic solution into the measurement target object can be accelerated. Thus, the measurement speed at the electrochemical measurement step can be accelerated, and speed-up of an electrochemical evaluation step can be realized.

In the preferred aspect, the front-side temperature of the measurement target object is set higher than a temperature at which condensation of moisture in the measurement target object begins, and the back-side temperature of the measurement target object is set lower than the temperature at which condensation of the moisture in the measurement target object begins.

According to the present configuration, the front-side temperature of the measurement target object is set higher than the temperature at which condensation of the moisture in the measurement target object begins, and the back-side temperature of the measurement target object is set lower than the temperature at which condensation of the moisture in the measurement target object begins. Thus, the speed of penetration of the electrolytic solution into the measurement target object can be accelerated. Consequently, the measurement speed at the electrochemical measurement step can be improved, and therefore, speed-up of the evaluation step using the electrochemical method can be realized.

In the preferred aspect, the method further includes the step of arranging a first temperature adjustment section configured to adjust the front-side temperature on a front side of the measurement target object, the step of arranging a second temperature adjustment section configured to adjust the back-side temperature on a back side of the measurement target object, and the step of adjusting the levels of the set temperature of the first temperature adjustment section and the set temperature of the second temperature adjustment section and a difference between the set temperature of the first temperature adjustment section and the set temperature of the second temperature adjustment section to adjust the levels of the front-side temperature and the back-side temperature of the measurement target object and the difference between the front-side temperature and the back-side temperature of the measurement target object.

According to the present configuration, the front-side and back-side temperatures can be adjusted with more favorable accuracy by means of the first temperature adjustment section and the second temperature adjustment section. Thus, the temperature difference between the front side and the back side can be adjusted with more favorable accuracy. Consequently, the penetration speed of the electrolytic solution can be adjusted with more favorable accuracy, and therefore, the measurement speed at the electrochemical measurement step can be adjusted with more favorable accuracy.

In the preferred aspect, the first temperature adjustment section adjusts the temperature of the electrolytic solution.

According to the present configuration, a section configured to adjust the temperature of the electrolytic solution itself is employed as the first temperature adjustment section, and therefore, adjustment of the front-side temperature can be facilitated.

In the preferred aspect, at the step of adjusting the levels of the front-side temperature and the back-side temperature of the measurement target object and the difference between the front-side temperature and the back-side temperature of the measurement target object, the set temperature of the first temperature adjustment section is set higher than the temperature at which condensation of the moisture in the measurement target object begins, and the set temperature of the second temperature adjustment section is set lower than the temperature at which condensation of the moisture in the measurement target object begins.

According to the present configuration, the front-side and back-side temperatures can be adjusted with more favorable accuracy by means of the first temperature adjustment section and the second temperature adjustment section. Thus, the temperature difference between the front side and the back side can be adjusted with more favorable accuracy. Consequently, the penetration speed of the electrolytic solution can be more effectively accelerated, and therefore, speed-up of the evaluation step using the electrochemical method can be realized.

In the preferred aspect, the measurement target object is a coating film of a coated metal material including the coating film on a base material, the electrolytic solution is arranged in contact with a front surface of the coating film, and the second temperature adjustment section is arranged on a back side of the coating film through the base material.

According to the present configuration, the measurement speed at the electrochemical measurement step regarding the coating film of the coated metal material can be adjusted as necessary. Thus, an evaluation speed at the electrochemical evaluation step for the coating film can be adjusted.

In the preferred aspect, the physical property is corrosion resistance of the coating film. Voltage is applied to between the front side and the back side of the coating film while increasing, and the corrosion resistance of the coating film is evaluated based on a voltage value upon breakdown of the coating film.

For example, a method in which voltage is applied to between the base material and the coated metal material and the coating film front surface to evaluate the corrosion resistance of the coating film based on the voltage value (hereinafter referred to as an "insulation voltage") upon breakdown of the coating film can be used as the method for evaluating the corrosion resistance of the coating film. The insulation voltage indicates appropriateness of insulation properties in association with the corrosion resistance of the coating film, and therefore, the corrosion resistance of the coated metal material can be evaluated by measurement of the insulation voltage. Voltage is applied to between the base material and the coating film front surface while increasing, and in this manner, the insulation voltage can be detected with more favorable accuracy. According to the present configuration, at the step of evaluating the corrosion resistance of the coated metal material, the measurement speed can be adjusted, and therefore, the evaluation speed can be adjusted.

In the preferred aspect, the base material of the coated metal material is an automobile member steel plate.

According to the present configuration, the evaluation speed at the step of evaluating the corrosion resistance of the coated metal material for an automobile can be adjusted.

In the preferred aspect, the coating film is an electrode-posited coating film.

According to the present configuration, the measurement speed in measurement regarding the corrosion resistance of the electrodeposited coating film can be adjusted.

In the preferred aspect, the first temperature adjustment section is a rubber heater, and the second temperature adjustment section is a Peltier element.

According to the present configuration, the rubber heater and the Peltier element can be each employed as the first temperature adjustment section and the second temperature adjustment section, and therefore, adjustment of the front-side and back-side temperatures of the measurement target object can be performed with more favorable accuracy.

The physical property evaluation device disclosed herein is a device for evaluating physical properties of a film-shaped measurement target object by means of an electrochemical method, the device including an electrolytic solution arranged in contact with a front surface of the measurement target object, an electrode arranged in contact with the electrolytic solution, a power supply electrically connected to the electrode and a back side of the measurement target object and configured to apply voltage to between the electrode and the back side of the measurement target object, a first temperature adjustment section arranged on a front side of the measurement target object and configured to adjust a front-side temperature, and a second temperature adjustment section arranged on a back side of the measurement target object and configured to adjust a back-side temperature. The speed of penetration of the electrolytic solution into the measurement target object is adjusted in such a manner that the levels of the set temperature of the first temperature adjustment section and the set temperature of the second temperature adjustment section and a difference between the set temperature of the first temperature adjustment section and the set temperature of the second temperature adjustment section are adjusted.

According to the present configuration, the front-side temperature of the measurement target object contacting the electrolytic solution is set higher or lower than the back-side temperature. With this configuration, as compared to a case where the front side and the back side have the same temperature, the speed of penetration of the electrolytic solution into the measurement target object can be accelerated or decelerated. That is, by adjusting the levels of the set temperature of the first temperature adjustment section and the set temperature of the second temperature adjustment section and the difference between the set temperature of the first temperature adjustment section and the set temperature of the second temperature adjustment section, the speed of penetration of the electrolytic solution into the measurement target object can be adjusted. Thus, a measurement speed at an electrochemical measurement step can be adjusted as necessary.

In a preferred aspect, the set temperature of the first temperature adjustment section is higher than the set temperature of the second temperature adjustment section.

According to the present configuration, the speed of penetration of the electrolytic solution into the measurement target object can be accelerated. Thus, the measurement speed at the electrochemical measurement step can be accelerated, and speed-up of an electrochemical evaluation step can be realized.

In the preferred aspect, the set temperature of the first temperature adjustment section is higher than a temperature at which condensation of moisture in the measurement target object begins, and the set temperature of the second temperature adjustment section is lower than the temperature at which condensation of the moisture in the measurement target object begins.

According to the present configuration, the front-side temperature of the measurement target object is set higher than the temperature at which condensation of the moisture in the measurement target object begins, and the back-side temperature of the measurement target object is set lower than the temperature at which condensation of the moisture in the measurement target object begins. Thus, the speed of penetration of the electrolytic solution into the measurement target object can be accelerated. Consequently, the measurement speed at the electrochemical measurement step can be improved, and therefore, speed-up of the evaluation step using the electrochemical method can be realized.

In the preferred aspect, the device further includes a container configured to house the electrolytic solution. The first temperature adjustment section is a rubber heater arranged at the outer periphery of the container and configured to adjust the temperature of the electrolytic solution housed in the container, and the second temperature adjustment section is a Peltier element arranged on the back side of the measurement target object.

According to the present configuration, a section configured to adjust the temperature of the electrolytic solution itself is employed as the first temperature adjustment section, and therefore, adjustment of the front-side temperature can be facilitated. Moreover, the rubber heater and the Peltier element are each employed as the first temperature adjustment section and the second temperature adjustment section, and therefore, adjustment of the front-side and back-side temperatures of the measurement target object can be performed with more favorable accuracy.

In the preferred aspect, the device further includes a container configured to house the electrolytic solution. The first temperature adjustment section is a rubber heater arranged outside the container and configured to adjust the temperature of the electrolytic solution through the container, and the second temperature adjustment section is a Peltier element arranged on the back side of the measurement target object.

According to the present configuration, a section configured to adjust the temperature of the electrolytic solution itself is employed as the first temperature adjustment section, and therefore, adjustment of the front-side temperature can be facilitated. Moreover, the rubber heater and the Peltier element are each employed as the first temperature adjustment section and the second temperature adjustment section, and therefore, adjustment of the front-side and back-side temperatures of the measurement target object can be performed with more favorable accuracy.

In the preferred aspect, the measurement target object is a coating film of a coated metal material including the coating film on a base material, the electrolytic solution is arranged in contact with a front surface of the coating film, and the second temperature adjustment section is arranged on a back side of the coating film through the base material.

According to the present configuration, the measurement speed at the electrochemical measurement step regarding the coating film of the coated metal material can be adjusted as necessary. Thus, an evaluation speed at the electrochemical evaluation step for the coating film can be adjusted.

In the preferred aspect, the base material of the coated metal material is an automobile member steel plate.

According to the present configuration, the evaluation speed at the step of evaluating the corrosion resistance of the coated metal material for an automobile can be adjusted.

In the preferred aspect, the coating film is an electrodeposited coating film.

According to the present configuration, the measurement speed in measurement regarding the corrosion resistance of the electrodeposited coating film can be adjusted.

In the preferred aspect, the physical property is corrosion resistance of the coating film, the power supply is electrically connected to between the electrode and the base material. Voltage is applied to between the electrode and the base material while increasing, and the corrosion resistance of the coating film is evaluated based on a voltage value upon breakdown of the coating film.

According to the present configuration, the measurement speed can be adjusted at the step of evaluating the corrosion resistance of the coated metal material, and therefore, the evaluation speed can be adjusted.

As described above, according to the present disclosure, the front-side temperature of the measurement target object contacting the electrolytic solution is set higher or lower than the back-side temperature. With this configuration, as compared to a case where the front side and the back side have the same temperature, the speed of penetration of the electrolytic solution into the measurement target object can be accelerated or decelerated. That is, by adjusting the levels of the front-side temperature and the back-side temperature of the measurement target object and the difference between the front-side temperature and the back-side temperature of the measurement target object, the speed of penetration of the electrolytic solution into the measurement target object can be adjusted. Thus, the measurement speed at the electrochemical measurement step can be adjusted as necessary.

DETAILED DESCRIPTION

Hereinafter, embodiments of the present disclosure will be described in detail with reference to the drawings. Description of the preferred embodiments below will be made merely as an example in nature, and is not intended to limit the present disclosure or applications or uses thereof.

First Embodiment

<Corrosion Resistance Evaluation Device>

A corrosion resistance evaluation device 1 (a physical property evaluation device) according to the present embodiment is a device configured to evaluate corrosion resistance of an electrodeposited coating film 5 (a film-shaped measurement target object, a coating film) of a coated steel plate 2 (a coated metal material) by means of an electrochemical method.

Figure 1:
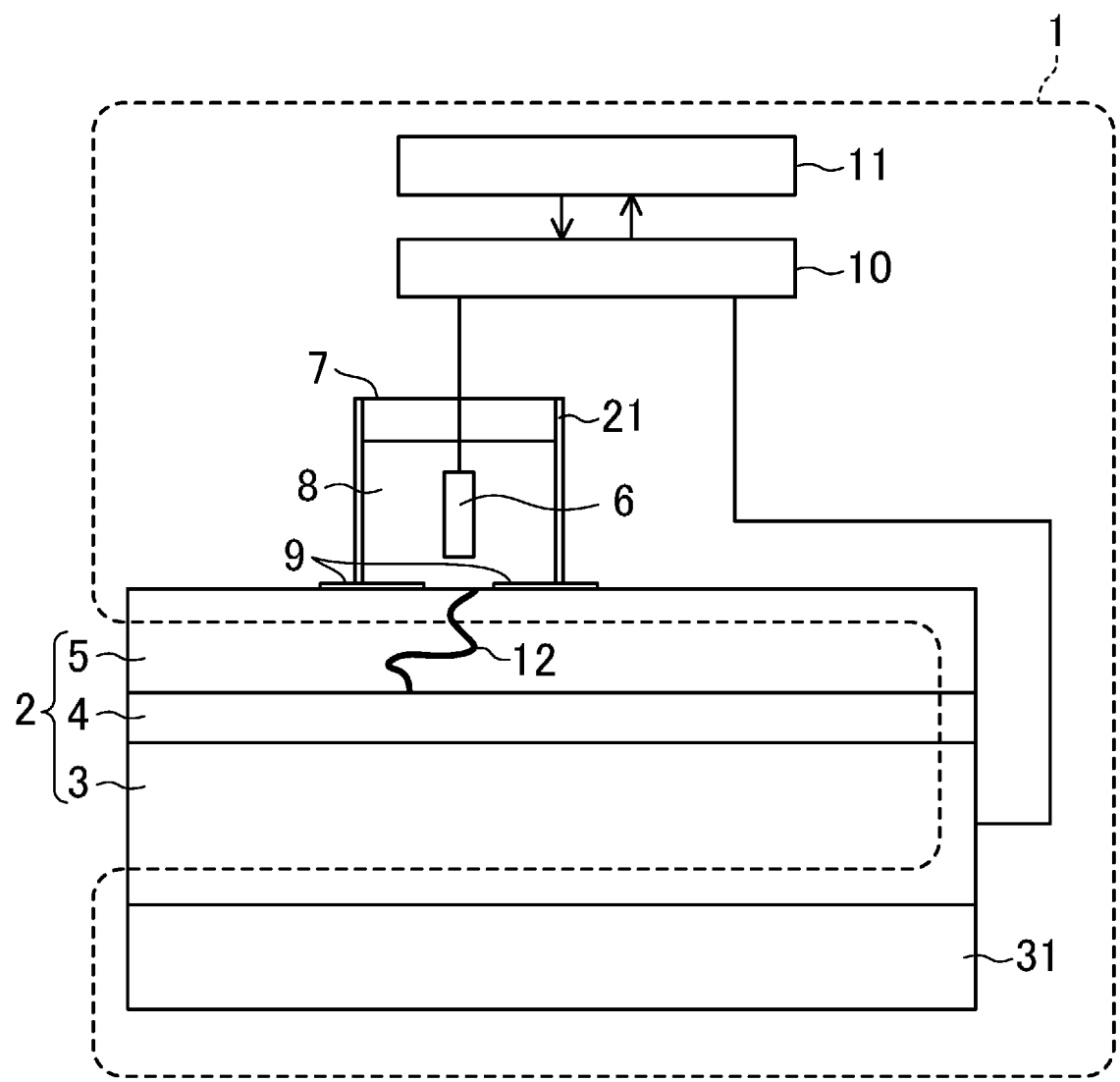
FIG. 1 is a view for describing a corrosion resistance evaluation device and a corrosion resistance evaluation method according to a first embodiment.

As illustrated in FIG. 1, the corrosion resistance evaluation device 1 includes an electrode 6, a container 7, an electrolytic solution 8, a rubber mat 9, a power supply device 10 (a power supply), an information processing terminal 11, a rubber heater 21 (a first temperature adjustment section), and a Peltier element 31 (a second temperature adjustment section).

Electrode

The electrode 6 is for applying voltage to between front and back sides of the electrodeposited coating film 5 as the measurement target object. Specifically, a carbon electrode, a platinum electrode, etc. can be used as the electrode 6. The shape of the electrode 6 is not specifically limited, and for example, those in shapes such as a rod shape, a block shape, a plate shape, and a pore shape can be used. The electrode 6 is arranged slightly apart from a front surface of the electrodeposited coating film 5 on the front side thereof.

Electrolytic Solution

The electrolytic solution 8 is, between the front surface of the electrodeposited coating film 5 and the electrode 6, arranged to contact both of the front surface of the electrodeposited coating film 5 and the electrode 6. The electrolytic solution 8 increases conductivity between the coated steel plate 2 and the electrode 6, and plays a role as a corrosion factor for the coated steel plate 2. As long as the electrolytic solution 8 is an electrolyte solution such as a water solution containing a supporting electrolyte, any electrolytic solution can be used. Specifically, examples of the supporting electrolyte include sodium chloride, potassium chloride, magnesium sulfate, potassium nitrate, calcium phosphate, and potassium bitartrate.

Container and Rubber Mat

The container 7 is arranged on the front surface of the electrodeposited coating film 5 of the coated steel plate 2 through the rubber mat 9 for liquid leakage prevention. The electrolytic solution 8 is housed in the container 7. The electrode 6 is arranged with the electrode 6 being dipped in the electrolytic solution 8. Moreover, as described above, the electrode 6 is arranged slightly apart from the front surface of the electrodeposited coating film 5, and therefore, a portion therebetween is filled with the electrolytic solution 8.

Power Supply Device

The power supply device 10 is electrically connected to the electrode 6 and a steel plate 3 as a base material of the coated steel plate 2. The power supply device 10 plays a role as a power supply unit configured to apply voltage to between the electrode 6 and the steel plate 3, and also plays a role as a current detection unit configured to detect current flowing therebetween. Specifically, a combination of a commercially-available high-voltage power supply and a commercially-available ammeter may be, for example, used as the power supply device 10. Moreover, e.g., a controllable potentio/galvanostat may be used as a voltage/current application method.

Information Processing Terminal

The information processing terminal 11 is communicably connected to the power supply device 10. The information processing terminal 11 plays a role as a control unit configured to control voltage applied to between the electrode 6 and the steel plate 3 by the power supply device 10. Moreover, based on a voltage value when breakdown of the electrodeposited coating film 5 occurs in association with voltage application by the power supply device 10, the power supply device 10 plays a role as a determination unit configured to evaluate corrosion resistance of the coated steel plate 2. Specifically, a versatile computer including a display, a keyboard, etc. can be used as the information processing terminal 11, for example.

Rubber Heater

The rubber heater 21 is a temperature adjustment section arranged at the outer periphery of the container 7 and configured to adjust the temperature of the electrolytic solution 8 housed in the container 7. The rubber heater 21 is not specifically limited, and a commercially-available heater can be employed as the rubber heater 21. The rubber heater 21 as the first temperature adjustment section is employed so that the temperature of the electrolytic solution 8 can be easily adjusted with favorable accuracy. Thus, adjustment of the front-side temperature of the electrodeposited coating film 5 can be easily performed with favorable accuracy. The rubber heater 21 is, for example, fixed in contact with an outer peripheral surface of the container 7 by means of a double-faced tape or a fastener. A not-shown temperature sensor and a not-shown temperature controller are electrically connected to the rubber heater 21. The temperature sensor are dipped in the electrolytic solution 8 in the container 7. Moreover, by the temperature controller, the temperature of the rubber heater 21 is controlled such that temperature adjustment is performed for the electrolytic solution 8.

Peltier Element

The Peltier element 31 is arranged on the back side of the electrodeposited coating film 5 through the steel plate 3 and a chemical film 4. Specifically, the Peltier element 31 is arranged in contact with a back surface of the steel plate 3, and adjust the temperature of the steel plate 3 to adjust the back-side temperature of the electrodeposited coating film 5. The Peltier element 31 is not specifically limited, and a commercially-available element can be employed as the Peltier element 31. The Peltier element 31 is employed so that the temperature of the steel plate 3 can be easily adjusted with favorable accuracy. Thus, adjustment of the back-side temperature of the electrodeposited coating film 5 can be easily performed with favorable accuracy. A not-shown temperature controller is electrically connected to the Peltier element 31. By the temperature controller, the temperature of the Peltier element 31 is controlled such that the temperature of the steel plate 3 is adjusted.

Corrosion Resistance Evaluation Method>

A corrosion resistance evaluation method (a physical property evaluation method) according to the present embodiment is the method for evaluating the corrosion resistance of the electrodeposited coating film 5 by means of the electrochemical method. For example, such a method can be performed using the above-described corrosion resistance evaluation device 1. The corrosion resistance evaluation method according to the present embodiment includes a preparation step, a temperature adjustment step, a measurement step, and an evaluation step. Hereinafter, these steps will be described in detail with reference to FIGS. 1 to 4.

<<Preparation Step>>

Preparation of Test Piece

First, a test piece of the coated steel plate 2 (the coated metal material) as an evaluation target is prepared. In the present embodiment, the coated steel plate 2 includes the steel plate 3 as the base material, the chemical film 4 formed on a front surface of the steel plate 3, and the electrodeposited coating film 5 (the measurement target object) as a coating film formed on the chemical film 4. That is, the steel plate 3 is arranged on the back side of the electrodeposited coating film 5.

The steel plate 3 is a steel plate for manufacturing, e.g., a building material or an automobile component, and is more preferably an automobile member steel plate. Specifically, e.g., a cold rolled steel plate (SPC), a galvannealed steel plate (GA), a high-tensile steel plate, or a hot stamp material can be used, and the SPC or the GA is more preferably used.

The chemical film 4 plays a role in reduction of direct contact of the corrosion factor with the steel plate 3 and rust reduction by alkaline environment on the steel plate 3 front surface by reaction of the chemical film 4 itself. Moreover, the chemical film 4 also plays a role in improvement of adhesiveness between the electrodeposited coating film 5 and the steel plate 3. Specifically, the chemical film 4 is a chromate conversion coating film or a zinc phosphate coating film, for example.

The electrodeposited coating film 5 as the measurement target object has high throwing power and high uniformity. After a baking step, the electrodeposited coating film 5 exhibits high corrosion resistance, and therefore, plays a role in protection of the steel plate 3. Specifically, e.g., epoxy resin-based paint or acrylic resin-based paint can be used.

Preparation of Measurement

After the test piece of the coated steel plate 2 has been prepared, preparation for measurement of the corrosion resistance evaluation device 1 is performed.

Specifically, the container 7 is first placed on the front surface of the electrodeposited coating film 5 of the coated steel plate 2 through the rubber mat 9, for example. Note that the rubber heater 21 is arranged at the periphery of the container 7. Moreover, the Peltier element 31 is arranged in contact with the back surface of the steel plate 3 of the coated steel plate 2. Further, a line not connected to the electrode 6 of the power supply device 10 is connected to the steel plate 3 of the coated steel plate 2.

Next, the inside of the container 7 is filled with the electrolytic solution 8. Accordingly, the electrolytic solution 8 contacts the front surface of the electrodeposited coating film 5. Then, the electrode 6 connected to the power supply device 10 is dipped in the electrolytic solution 8, and in a non-contact state, is held above the front surface of the electrodeposited coating film 5. Moreover, the temperature sensor connected to the rubber heater 21 is also dipped in the electrolytic solution 8.

<<Temperature Adjustment Step>>

In this state, a difference between the set temperature of the rubber heater 21 and the set temperature of the Peltier element 31 is adjusted. Accordingly, a difference between the front-side temperature of the electrodeposited coating film 5 and the back-side temperature of the electrodeposited coating film 5 is adjusted. Details of such temperature adjustment will be described later.

<<Measurement Step>>

Under control of the information processing terminal 11, voltage is applied to between the electrode 6 and the steel plate 3 by the power supply device 10. At this point, the voltage applied by the power supply device 10 is, as indicated by a chain line of FIG. 2, applied to gradually increase, i.e., increase little by little, over time. With this configuration, insulation voltage can be detected with more favorable accuracy. Specifically, the sweep speed of the applied voltage is, for example, within a range of 0.1 to 10 V/s, more preferably 0.5 to 2 V/s.

Figure 2:
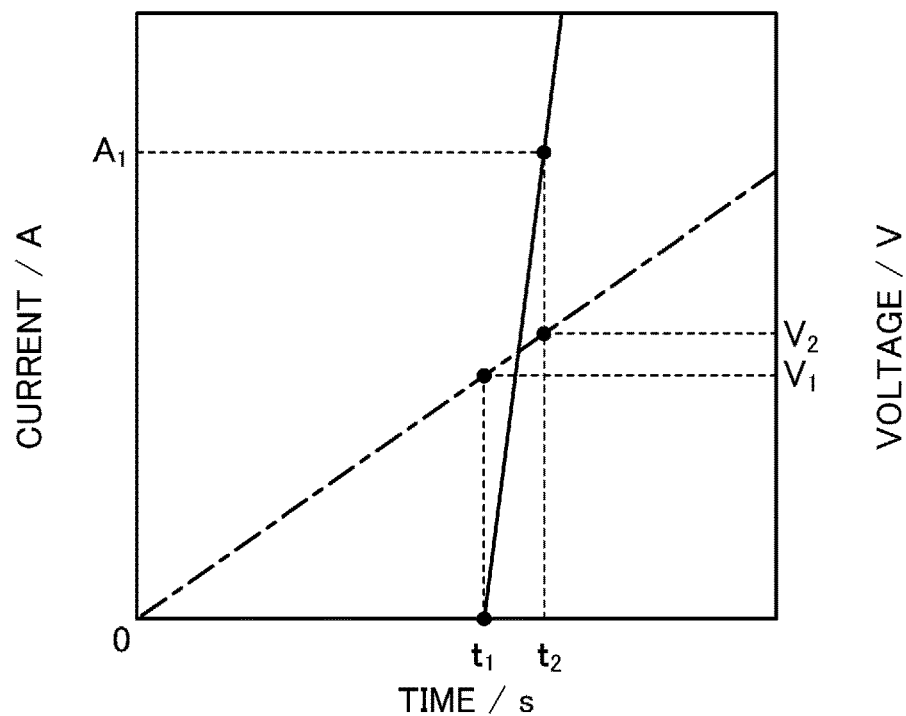
FIG. 2 is a graph showing a change (a chain line) in voltage applied to between an electrode and a steel plate and a change (a solid line) in current flowing between the electrode and the steel plate in association with application of the voltage.

Then, the power supply device 10 detects current flowing between the electrode 6 and the steel plate 3 upon voltage application. In FIG. 2, a current change is indicated by a solid line. As illustrated in FIG. 2, even when the applied voltage is increased, almost no current flows between the electrode 6 and the steel plate 3 until a voltage value $V_1$ at time $t_1$. However, when the voltage exceeds the voltage value $V_1$, a current amount rapidly increases, and reaches a threshold $A_1$ at a voltage value $V_2$ (time $t_2$).

This can be assumed as follows. That is, performance for blocking the corrosion factor, i.e., the electrolytic solution 8, in the electrodeposited coating film 5 is maintained until the voltage value $V_1$, and the current amount is suppressed. Meanwhile, due to an increase in the applied voltage, penetration of the electrolytic solution 8 into the electrodeposited coating film 5 is promoted. Then, as indicated by a reference numeral 12 of FIG. 1, the electrodeposited coating film 5 is gradually broken down due to penetration of the electrolytic solution 8, and the electrolytic solution 8 eventually reaches the front surface of the steel plate 3. It is assumed that conductivity between the electrode 6 and the steel plate 3 rapidly increases and a rapid increase in the current amount is shown. That is, it can be assumed that when the electrolytic solution 8 reaches the front surface of the steel plate 3, breakdown of the electrodeposited coating film 5 occurs and the blocking performance thereof is lost.

<<Evaluation Step>>

Supposing that the voltage value $V_2$ when the current amount reaches the threshold $A_1$ is the insulation voltage, it is assumed that the time $t_2$ at which the insulation voltage $V_2$ is brought corresponds to a period until the corrosion factor reaches the steel plate 3.

Generally, in a coating metal material, occurrence of rust, i.e., corrosion, begins when a corrosion factor such as salt water penetrates a coating film and reaches a base material. Thus, the process of corrosion of the coating metal material is divided into a process until occurrence of rust and the process of growth of the caused rust. Each process can be evaluated based on a period (a corrosion suppression period) until corrosion begins and the speed (a corrosion speed) of growth of corrosion. The time $t_2$ at which the insulation voltage $V_2$ is brought corresponds to the period until the corrosion factor reaches the steel plate 3, and therefore, the insulation voltage $V_2$ indicates appropriateness of insulation properties in association with the corrosion resistance of the coating film, and correlates with the above-described corrosion suppression period.

The above-described corrosion suppression period can be separately experimentally measured by a corrosion promotion test such as a combined cyclic test or a salt spray test. Thus, a correlation between the corrosion suppression period and the insulation voltage is experimentally obtained in advance, and based on such a correlation, the corrosion suppression period of the test piece is obtained from an actual measurement value of the insulation voltage of such a test piece. In this manner, the corrosion resistance of the coating film can be evaluated.

Figure 3:
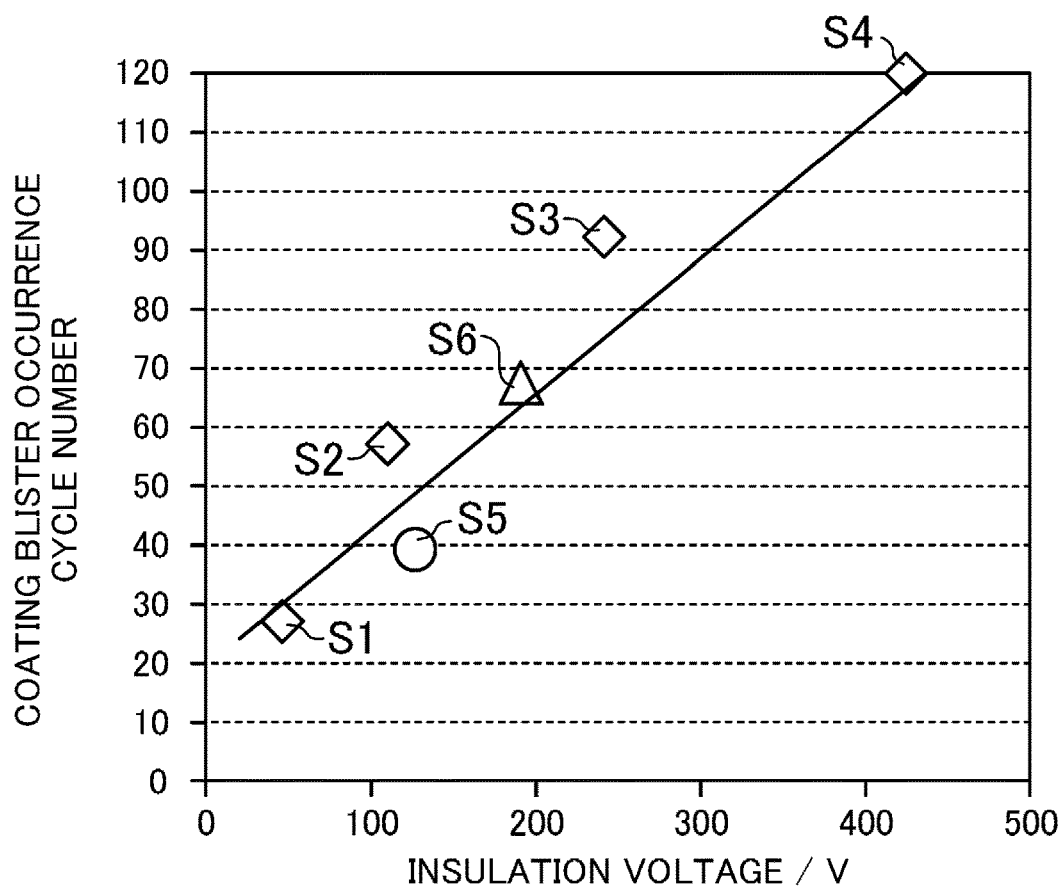
FIG. 3 is a graph showing one example of a correlation between an insulation voltage and a coating blister occurrence cycle number.
Figure 4:
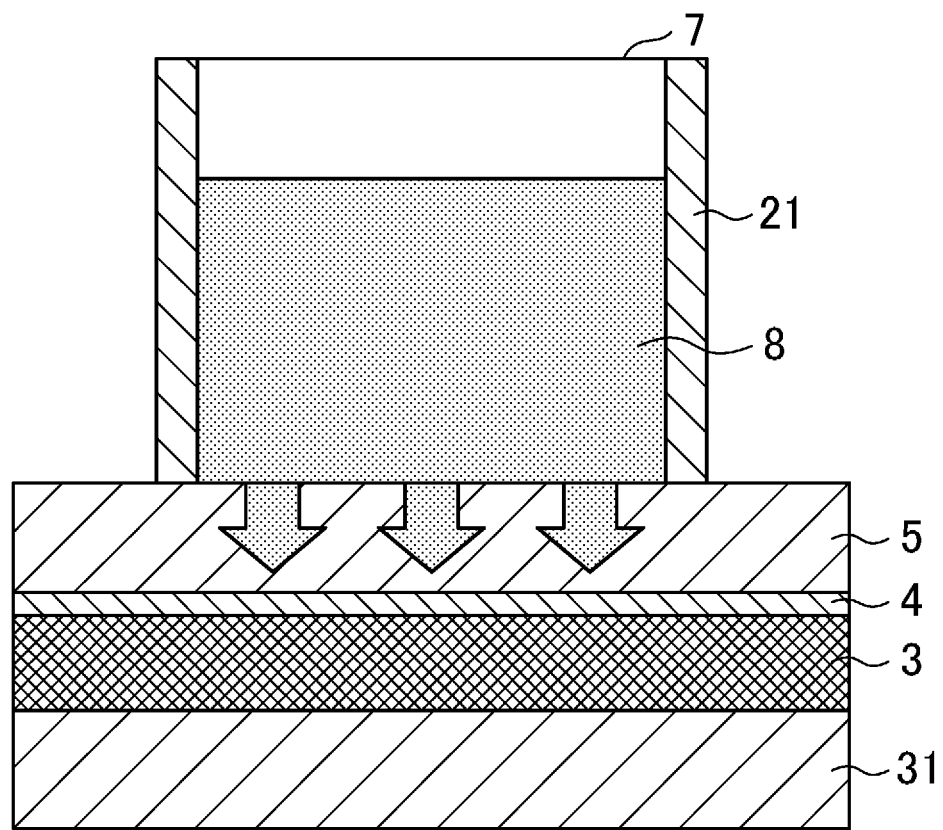
FIG. 4 is a view for describing the principle of the corrosion resistance evaluation method according to the first embodiment.

Specifically, one example of a correlation between a coating blister occurrence cycle number indicating the corrosion suppression period and obtained by the combined cyclic test as the corrosion promotion test and the insulation voltage $V_2$ is shown in FIG. 3. Note that the evaluation target is the coated steel plate 2 formed in such a manner that the zinc phosphate coating film as the chemical film 4 is formed on the front surface of the SPC as the steel plate 3 and the electrodeposited coating film made of the epoxy resin-based paint as the electrodeposited coating film 5 is formed on the front surface of the zinc phosphate coating film. The combined cyclic test was performed in such a manner that the steps of salt spraying (eight hours), drying (eight hours), and moistening (eight hours) are, for the test piece, performed for 24 hours as one cycle and a cycle number at which a coating blister (rust) is formed across 20% of the surface of the test piece, i.e., the coating blister occurrence cycle number, is obtained as the corrosion suppression period. Moreover, the insulation voltage was measured by the above-described method under a condition where any of the set temperatures of the rubber heater 21 and the Peltier element 31 is 23° C. under environment of an external air temperature of 23° C. and an external air humidity of 30%.

In FIG. 3, four points indicated by S1 to S4 indicate a baking condition of 150° C. for 20 minutes in the coated steel plates 2 having the electrodeposited coating films 5 with film thicknesses of 5 μm, 7 μm, 10 μm, and 15 μm. Moreover, three points S5, S6, S3 indicate baking conditions of 140° C. for 15 minutes, 140° C. for 20 minutes, and 150° C. for 20 minutes in the coated steel plate 2 having the electrodeposited coating films 5 with a film thickness of 10 μm. As illustrated in FIG. 3, the above-described points are along a regression line even when the thickness of the electrodeposited coating film 5 and the baking condition change, and a determination coefficient R2 thereof is 0.83. Thus, it can be said that there is a high correlation between the coating blister occurrence cycle number as the corrosion suppression period and the insulation voltage $V_2$.

As described above, the corrosion suppression period of the test piece is, as the corrosion resistance of the electrodeposited coating film 5, obtained from the actual measurement value of the insulation voltage $V_2$ of the test piece based on the above-described correlation, and therefore, the corrosion resistance of the electrodeposited coating film 5 can be evaluated.

Note that the threshold $A_1$ of the current amount may be set to such an extent that a rapid increase in the current amount can be detected, for example, and is specifically preferably equal to or higher than 0.5 mA. More preferably, the threshold $A_1$ is 1 to 50 mA, much more preferably 5 to 15 mA.

<Features>

The corrosion resistance evaluation method according to the present embodiment is characterized in that the levels of the set temperature of the rubber heater 21 and the set temperature of the Peltier element 31 and the difference between the set temperature of the rubber heater 21 and the set temperature of the Peltier element 31 are adjusted such that the levels of the front-side temperature and the back-side temperature of the electrodeposited coating film 5 and the difference between the front-side temperature and the back-side temperature of the electrodeposited coating film 5 are adjusted. Hereinafter, the temperature adjustment step will be described in detail.

As described above, the electrolytic solution 8 arranged in contact with the front surface of the electrodeposited coating film 5 penetrates into the electrodeposited coating film 5 from the front side.

At this point, when the set temperature of the rubber heater 21 is, for example, increased as compared to the set temperature of the Peltier element 31, the temperature of the electrolytic solution 8 becomes higher than the temperature of the steel plate 3. Accordingly, the front-side temperature of the electrodeposited coating film 5 contacting the electrolytic solution 8 becomes higher than the back-side temperature of the electrodeposited coating film 5 contacting the steel plate 3. Thus, a temperature gradient that the temperature decreases from the front side to the back side in the electrodeposited coating film 5 is caused.

Fluid moves from a high-temperature location with high energy to a low-temperature location with low energy. Thus, when the temperature gradient is caused in the electrodeposited coating film 5 as described above, the speed of penetration of the electrolytic solution 8 into the electrodeposited coating film 5 is accelerated as compared to a case in which no temperature gradient is caused, as indicated by arrows of FIG. 4. The time $t_2$ until the insulation voltage $V_2$ illustrated in FIG. 2 is shortened. Thus, the measurement speed of the insulation voltage $V_2$ can be improved, and speed-up of the step of evaluating the corrosion resistance can be realized.

Conversely, when the set temperature of the rubber heater 21 becomes lower than the set temperature of the Peltier element 31, the temperature of the electrolytic solution 8 becomes lower than the temperature of the steel plate 3. Accordingly, a temperature gradient that the temperature increases from the front side to the back side in the electrodeposited coating film 5 is caused. Thus, the speed of penetration of the electrolytic solution 8 into the electrodeposited coating film 5 can be decreased as compared to a case where no temperature gradient is caused. For example, in the case of comparing the corrosion resistance among multiple electrodeposited coating films 5, the penetration speed of the electrolytic solution 8 might be too high in the first place due to the film quality of the electrodeposited coating film 5, and for this reason, it might be difficult to observe a difference among these measurement target objects. In this case, it might be effective to decrease the speed of penetration of the electrolytic solution 8 into the electrodeposited coating film 5.

In either case regarding whether the set temperature of the rubber heater 21 or the set temperature of the Peltier element 31 is higher, the difference therebetween is increased so that the degree of acceleration or deceleration in the penetration speed can be increased.

As described above, the levels of the front-side temperature and the back-side temperature of the electrodeposited coating film 5 and the difference between the front-side temperature and the back-side temperature of the electrodeposited coating film 5 are adjusted so that the speed of penetration of the electrolytic solution into the electrodeposited coating film 5 can be adjusted. Thus, the time $t_2$ until the insulation voltage $V_2$ can be shortened. Consequently, the measurement speed at the measurement step in the corrosion resistance evaluation method can be adjusted as necessary.

Second Embodiment

Hereinafter, other embodiments according to the present disclosure will be described in detail. Note that in description of these embodiments, the same reference numerals are used to represent the same elements as those of the first embodiment, and detailed description thereof will be omitted.

Corrosion resistance evaluation method and device according to the present embodiment are characterized in that specifically at the above-described temperature adjustment step, the set temperature of the rubber heater 21 is higher than a temperature at which condensation of moisture in the electrodeposited coating film 5 begins and the set temperature of the Peltier element 31 is lower than the temperature at which condensation of the moisture in the electrodeposited coating film 5 begins.

Generally, a saturated moisture amount $a(T)$ [g/m³] contained in the air is a moisture mass (g) which can be present in a space per unit volume (1 m³), and is calculated by Expression (1) below.

$$a(T) = (217 \times e(T))/(T+273.15) \quad (1),$$

where T is a temperature [° C.] and e(T) is a saturated moisture pressure [hPa], and e(T) can be approximately obtained by Expression (2) below.

$$e(T)=6.1078\times10^{[7.5T/(T+237.3)]} \quad (2)$$

Figure 5:
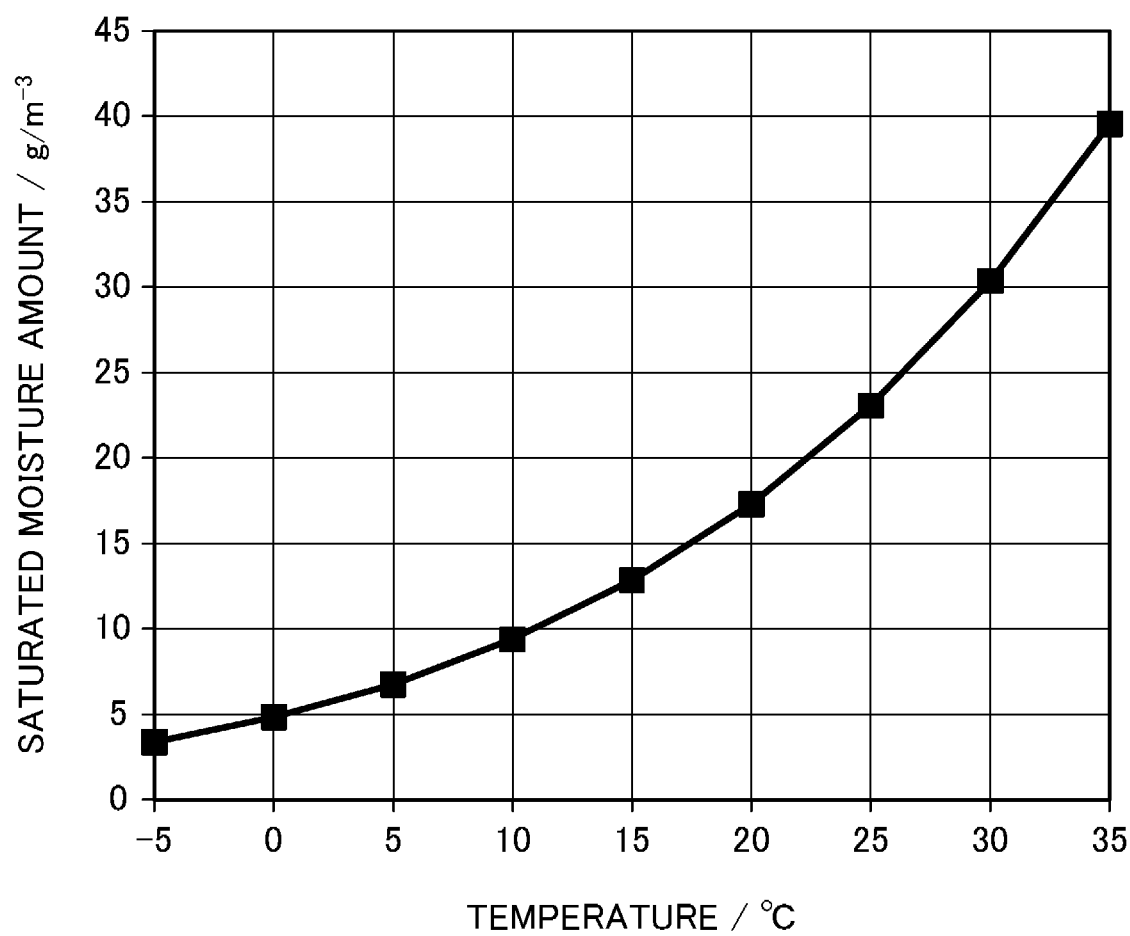
FIG. 5 is a graph showing a relationship between a temperature and a saturated moisture amount.

A relationship between the saturated moisture amount calculated by Expression (1) above and the temperature is shown in FIG. 5. For example, environment with an external air temperature of 25° C. and an external air humidity of 30% is assumed. In this case, the saturated moisture amount contained in external air is about 23 g. Since the external air humidity is 30%, a moisture of about 7 g (=23 g×0.3) is contained in the external air. When the external air temperature decreases to, e.g., 0° C., the saturated moisture amount at a temperature of 0° C. is, as seen from FIG. 5, about 5 g, and therefore, a moisture of about 2 g (=7-5) is condensed into liquid water.

Figure 6:
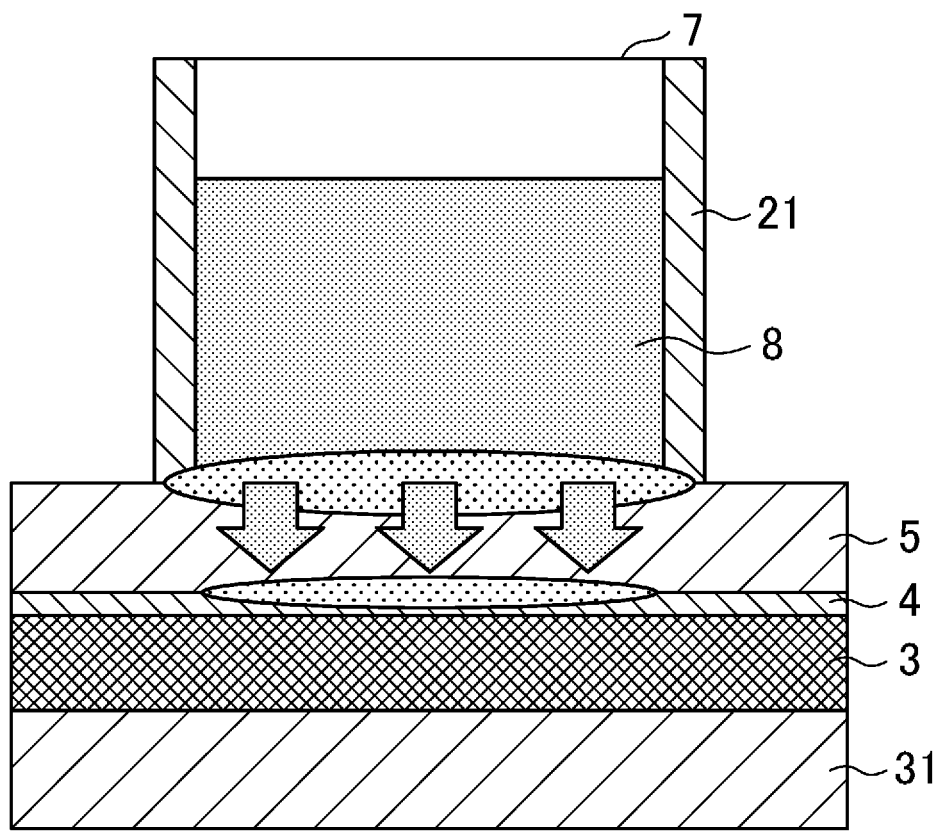
FIG. 6 is a view for describing the principle of a corrosion resistance evaluation method according to a second embodiment.

The set temperature of the rubber heater 21, i.e., the temperature of the electrolytic solution 8, is increased as compared to the temperature at which condensation of the moisture in the electrodeposited coating film 5 begins, and the set temperature of the Peltier element 31, i.e., the temperature of the steel plate 3, is decreased as compared to a temperature at which condensation of the moisture in the external air begins. Accordingly, moisture contained in air present on the front side of the electrodeposited coating film 5 is condensed and liquefied on the back side of the electrodeposited coating film 5. Then, in addition to the temperature gradient, the flow of moisture and liquid water as indicated by arrows of FIG. 6 is formed in the electrodeposited coating film 5. Thus, penetration of the electrolytic solution 8 is greatly promoted.

Specifically, when the set temperature of the rubber heater 21 is increased as compared to the external air temperature, the amount of moisture contained in the air present on the front side of the electrodeposited coating film 5 can be increased, and therefore, the flow of moisture and liquid water from the front side to the back side in the electrodeposited coating film 5 can be increased. Thus, penetration of the electrolytic solution 8 into the electrodeposited coating film 5 can be further promoted.

Note that even in a case where the set temperature of the Peltier element 31, i.e., the temperature of the steel plate 3, is decreased to, e.g., equal to or lower than 0° C., the liquefied water is in a supercooled state and is not condensed at a higher temperature than a temperature at which condensation of the liquefied water actually begins. Then, when the set temperature of the Peltier element 31 is decreased to equal to or lower than the temperature at which condensation of the liquefied water begins, condensation of the liquefied water begins. It is assumed that when the liquefied water is condensed, it is difficult to promote penetration of the electrolytic solution 8 into the electrodeposited coating film 5. Thus, the set temperature of the Peltier element 31, i.e., the temperature of the steel plate 3, can be a higher temperature than the temperature at which condensation of the liquefied water begins. Note that the temperature at which condensation of the liquefied water begins might change due to various conditions such as measurement conditions.

As described above, according to the corrosion resistance evaluation method and device according to the present embodiment, the speed of penetration of the electrolytic solution 8 into the electrodeposited coating film 5 can be considerably accelerated. Thus, a measurement speed at an electrochemical measurement step can be improved, and therefore, speed-up of an evaluation step using an electrochemical method can be realized.

Other Embodiments

In the above-described embodiments, the first temperature adjustment section is the rubber heater, and the second temperature adjustment section is the Peltier element. However, the section configured to adjust the temperature difference between the front side and the back side of the electrodeposited coating film 5 is not limited to such a configuration. For example, either one of the first temperature adjustment section or the second temperature adjustment section may be provided, and the temperature of either one of the front side or the back side of the electrodeposited coating film 5 may be increased or decreased. Alternatively, any of the first temperature adjustment section and the second temperature adjustment section may be the rubber heater or the Peltier element. Alternatively, the first temperature adjustment section may be the Peltier element, and the second temperature adjustment section may be the rubber heater. Instead of the rubber heater, e.g., a hot plate may be used as a heating device. Alternatively, the first temperature adjustment section may be configured such that instead of the electrolytic solution 8, the rubber heater or the Peltier element is arranged on the front surface of the electrodeposited coating film 5 outside the container 7 to heat or cool the front side itself of the electrodeposited coating film 5

In the above-described embodiments, it is configured such that at the measurement step, the voltage is applied while increasing little by little over time and the corrosion resistance of the electrodeposited coating film 5 is evaluated based on the detected insulation voltage $V_2$, but the measurement method is not limited to such a configuration. Specifically, e.g., a method in which a current amount change is observed with constant voltage being applied and the corrosion resistance of the electrodeposited coating film 5 is evaluated based on the time $t_2$ until the current amount reaches the threshold $A_1$ after the start of measurement may be employed.

In the above-described embodiments, it can be configured such that the coated steel plate 2 as the evaluation target includes a multi-layer film of two or more layers as the coating film. Specifically, e.g., a multi-layer film including, in addition to the electrodeposited coating film 5, an intermediate coating film on the electrodeposited coating film 5 or a multi-layer film further including an upper coating film etc. on the intermediate coating film can be employed. The intermediate coating film plays a role in ensuring of finishing properties and chipping resistance of the coated steel plate 2 and improvement of adhesiveness between a lower coating film and the upper coating film. Moreover, the upper coating film is for ensuring the color, finishing properties, and weather resistance of the coated steel plate 2. These coating films are, for example, made of paint containing base resin such as polyester resin, acrylic resin, or alkyd resin and a cross-linker such as melamine resin, urea resin, or a polyisocyanate compound (including a block body). With this configuration, at, e.g., the step of manufacturing an automobile member, a component is taken out of a manufacturing line at every coating step so that, e.g., the quality of the coating film can be checked.

In the above-described embodiments, a conductive solid body containing the electrolytic solution 8 may be used instead of the container 7 and the rubber mat 9. The conductive solid body may be a solid body which can be in any shape according to the shape of the evaluation target which containing the electrolytic solution 8, and may exhibit conductivity. Specifically, the solid body may be, for example, preferably a solid body containing sodium chloride, potassium bitartrate, distilled water, and an oil content such as oleic acid or linoleic acid in solid body base powder containing gliadin, glutenin, starch, etc. In this case, a compound ratio among these components is, in terms of a volume ratio, preferably a solid body base powder of 30 to 50%, a sodium chloride of 10 to 30%, a potassium bitartrate of 10 to 30%, a distilled water of 10 to 45%, and an oil content of 3 to 15%. With this configuration, measurement can be performed without limitations on the shape of a test piece having no flat surface, specifically limitations on the shape of a test piece at an edge portion or a curved surface of the coated steel plate 2, for example Note that in the case of using the conductive solid body, it is effective that the first temperature adjustment section such as the rubber heater or the Peltier element is arranged on the front surface of the electrodeposited coating film 5 to heat or cool the front side itself of the electrodeposited coating film 5 as described above.

In the above-described embodiments, the method and device for evaluating the corrosion resistance of the electrodeposited coating film 5 of the coated steel plate 2 have been described by way of example as the physical property evaluation method and device according to the present disclosure, but the present disclosure is not limited to such method and device. That is, the physical property evaluation method and device according to the present disclosure can be broadly used for physical property evaluation for the film-shaped measurement target object using the electrochemical method. Specifically, such method and device can be, for example, used for evaluation of oxidation reduction properties of the film-shaped measurement target object by cyclic voltammetry measurement.

EXAMPLES

Hereinafter, specifically-implemented examples will be described.

<Test Piece>

First to fifth examples had the same test piece configuration.

Specifically, a test piece (about 50 mm square) of the coated steel plate 2 using the SPC as the steel plate 3 and configured such that the chemical film 4 and the electrodeposited coating film 5 are formed on the front surface of the steel plate 3 was prepared. The chemical film 4 was the zinc phosphate coating film, and chemical processing time using zinc phosphate was 120 seconds. The electrodeposited coating film 5 was formed using the epoxy resin-based paint. The baking condition in electrodeposition coating was 150° C.×20 minutes. The thickness of the steel plate 3 was 2 mm, and the thickness of the electrodeposited coating film 5 was 10 μm.

<Corrosion Resistance Evaluation Test>

Using the above-described test piece, the corrosion resistance of the electrodeposited coating film 5 was evaluated using the corrosion resistance evaluation device 1 of FIG. 1.

Specifically, an acrylic resin cylinder with an inner diameter of 20 mm, an outer diameter of 22 mm, and a height of 60 mm was used as the container 7. A silicon rubber heater (manufactured by Hakko Electric Co. Ltd., a standard type, an A type with a double-sided tape) as the rubber heater 21 was bonded across the entire circumference and entire height of the outer peripheral surface of the container 7. The temperature sensor (manufactured by Three High Co., Ltd., a thermocouple (a K type) mold type) was connected to the rubber heater 21, and a sensor portion of a tip end of the temperature sensor was dipped in the electrolytic solution 8. A commercially-available silicon rubber sheet (a thickness of about 0.5 mm, 30 mm×30 mm) having a hole with a diameter of 18 mm was used as the rubber mat 9. The rubber mat 9 was placed on the front surface of the electrodeposited coating film 5, and the container 7 to which the rubber heater 21 is bounded was arranged to cover the above-described hole of the rubber mat 9. The inside of the container 7 was filled with a sodium chloride water solution of 5% by mass as the electrolytic solution 8. A commercially-available rod-shaped carbon electrode (a diameter of about 5 mm, a length of about 30 mm) as the electrode 6 was dipped in the electrolytic solution 8. A thermo-module (manufactured by VICS, LVPU-70) as the Peltier element 31 was arranged on the back side of the steel plate 3. The high-voltage power supply (manufactured by Trek Japan, Model 2220) and the ammeter (manufactured by Kikusui Electronics Corporation, DME1600) as the power supply device 10 were connected to the electrode 6 and the steel plate 3. The temperature controller (manufactured by Hakko Electric Co. Ltd., Double-Thermo 100) was connected to the rubber heater 21 to perform temperature management. Moreover, the temperature controller (manufactured by VICS, VTH-1000) was connected to the Peltier element 31 to perform temperature management. The set temperatures of the rubber heater 21 and the Peltier element 31 were as shown in Table 1.

TABLE 1

| | | Set Temperature (° C.) | | |
|---|---|---|---|---|
| Examples | Reference Character | Rubber Heater | Peltier Element | Temperature Difference (° C.) |
| 1 | E1 | 25 | 25 | 0 |
| 2 | E2 | 65 | 25 | 40 |
| 3 | E3 | 80 | 25 | 55 |
| 4 | E4 | 80 | 10 | 70 |
| 5 | E5 | 25 | −0.5 | 25.5 |

For the test pieces of the first to fifth examples, the voltage value of the electrode 6 for the steel plate 3 was increased from 0 V at a sweep speed of 1 V/s by means of the above-described high-voltage power supply under environment with an external air temperature of 25° C. and an external air humidity of 30%, and the insulation voltage $V_2$ was measured. Results are shown in FIG. 7.

As described above, the time $t_2$ at which the insulation voltage $V_2$ is brought corresponds to the time until the corrosion factor reaches the steel plate 3. Thus, even in the case of the same measurement target object, as the penetration speed of the electrolytic solution 8 increases, the time $t_2$ becomes shorter and the insulation voltage $V_2$ becomes lower. Conversely, as the penetration speed of the electrolytic solution 8 decreases, the time $t_2$ becomes longer and the insulation voltage $V_2$ becomes higher. That is, in the case of the same measurement target object, the insulation voltage $V_2$ decreases as the penetration speed of the electrolytic solution 8 increases.

Figure 7:
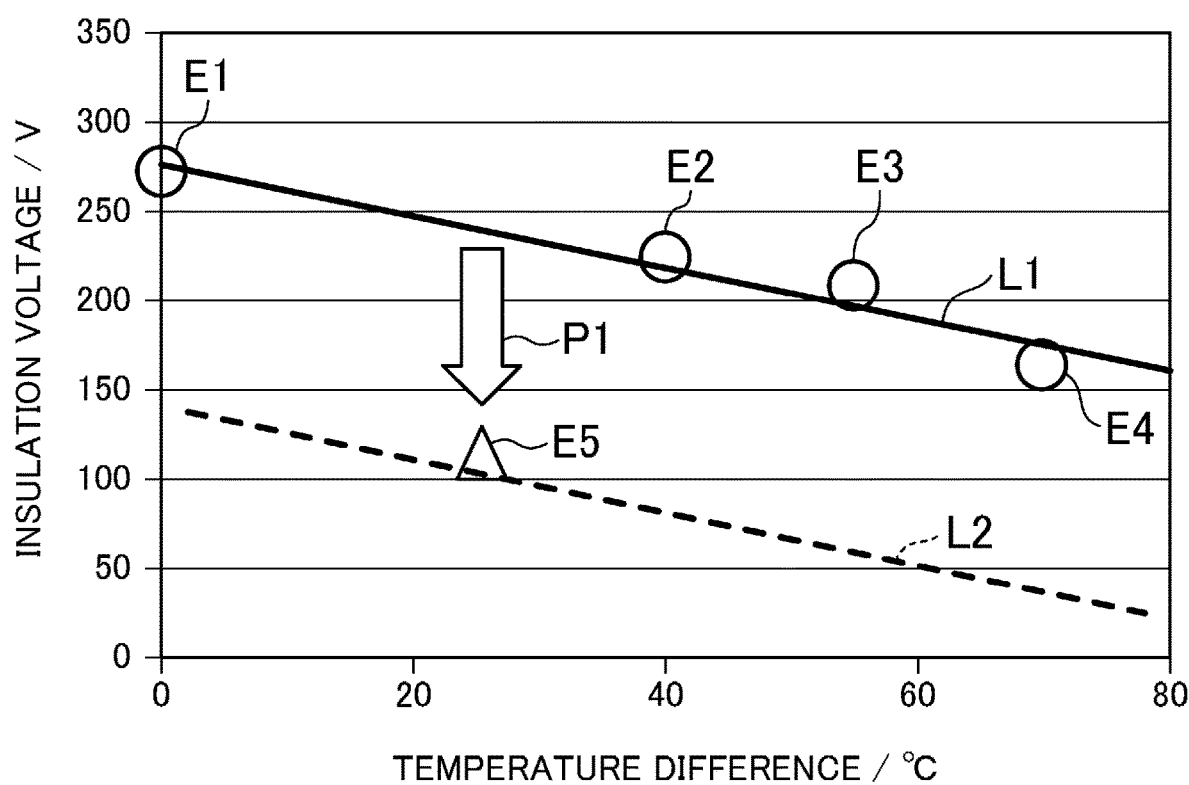
FIG. 7 is a graph showing a relationship between an insulation voltage and a temperature difference in an example.

The results of the first to fourth examples show that as indicated by a regression line L1 of FIG. 7, when the temperature difference between the rubber heater 21 and the Peltier element 31 increases in a state in which the set temperature of the rubber heater 21 is higher than the set temperature of the Peltier element 31, the insulation voltage $V_2$ decreases, i.e., the penetration speed of the electrolytic solution 8 increases.

Moreover, the results of the fifth example show that when the temperature of the Peltier element 31 is decreased to −0.5° C. lower than the temperature (about 7° C. under this test environment) at which condensation of the moisture in the air begins, the insulation voltage greatly decreases to deviate from the regression line L1 of the results of the first to fourth examples as indicated by an arrow P1 of FIG. 7. It is assumed that when the temperature of the Peltier element 31 is decreased to −0.5° C., the moisture in the air is condensed in the vicinity of an interface between the steel plate 3 and the electrodeposited coating film 5, and penetration of the electrolytic solution 8 into the electrodeposited coating film 5 is greatly promoted. It is assumed that in a state in which the temperature of the Peltier element 31 is lower than the temperature at which condensation of the moisture in the air begins, the temperature difference from the rubber heater 21 is increased and a decrease in the insulation voltage, i.e., an increase in the penetration speed of the electrolytic solution 8, as indicated by a line L2 of FIG. 7 is observed accordingly.

The present disclosure is useful in the field of the physical property evaluation method and device.

What is claimed is:

1. A method for evaluating a physical property of a film-shaped measurement target object by means of an electrochemical method, comprising:
   a step of causing an electrolytic solution to contact a front surface of the measurement target object,
   a step of arranging a first temperature adjustment section configured to adjust a front-side temperature on a front side of the measurement target object;
   a step of arranging a second temperature adjustment section configured to adjust a back-side temperature on a back side of the measurement target object; and
   a step of setting a set temperature of the first temperature adjustment section higher than a temperature at which condensation of moisture in the measurement target object begins, and setting a set temperature of the second temperature adjustment section lower than the temperature at which condensation of the moisture in the measurement target object begins and higher than the temperature at which condensation of liquefied water begins,
   wherein the measurement target object is a coating film of a coated metal material including the coating film on a base material,
   the electrolytic solution is arranged in contact with a front side of the coating film,
   the second temperature adjustment section is arranged on a back side of the coating film through the base material,
   the physical property is corrosion resistance of the coating film, and
   a voltage is applied to between the front side and the back side of the coating film while increasing, and the corrosion resistance of the coating film is evaluated based on a voltage value upon breakdown of the coating film.

2. The physical property evaluation method according to claim 1, wherein
   the first temperature adjustment section adjusts a temperature of the electrolytic solution.

3. The physical property evaluation method according to claim 1, wherein
   the base material of the coated metal material is an automobile member steel plate.

4. The physical property evaluation method according to claim 1, wherein
   the coating film is an electrodeposited coating film.

5. The physical property evaluation method according to claim 1, wherein
   the first temperature adjustment section is a rubber heater, and
   the second temperature adjustment section is a Peltier element.

\* \* \* \* \*